US011876324B2

(12) United States Patent
O'Neill et al.

(10) Patent No.: US 11,876,324 B2
(45) Date of Patent: Jan. 16, 2024

(54) SELF-EJECTING ELECTRICAL CONNECTION SYSTEM

(71) Applicant: Aptiv Technologies Limited, St. Michael (BB)

(72) Inventors: Rachel O'Neill, Chagrin Falls, OH (US); Shawna Higgins, Youngstown, OH (US); Marcia Lytle, Youngstown, OH (US); Prasanna Ramakrishnan, Chennai (IN); Rangarajan Sundarakrishnamachari, Chennai (IN)

(73) Assignee: Aptiv Technologies AG, Schaffhausen (CH)

( * ) Notice: Subject to any disclaimer, the term of this patent is extended or adjusted under 35 U.S.C. 154(b) by 182 days.

(21) Appl. No.: 17/588,955

(22) Filed: Jan. 31, 2022

(65) Prior Publication Data

US 2023/0030374 A1 Feb. 2, 2023

Related U.S. Application Data

(60) Provisional application No. 63/227,117, filed on Jul. 29, 2021.

(51) Int. Cl.
*H01R 13/635* (2006.01)
*H01R 13/627* (2006.01)

(52) U.S. Cl.
CPC ....... *H01R 13/635* (2013.01); *H01R 13/6272* (2013.01)

(58) Field of Classification Search
CPC .......................... H01R 13/6272; H01R 13/635
USPC .......................................................... 439/352
See application file for complete search history.

(56) References Cited

U.S. PATENT DOCUMENTS 4,548,455 A * 10/1985 Ezure .................. H01R 13/627 439/352
4,954,097 A * 9/1990 Sekiguchi ............ H01R 13/627 439/352
5,176,533 A * 1/1993 Sakurai ............. H01R 13/6277 439/352
5,791,930 A * 8/1998 Tabata ................ H01R 13/641 439/352

(Continued)

FOREIGN PATENT DOCUMENTS

| | | |
|---|---|---|
| DE | 102005044148 B4 | 8/2009 |
| EP | 1411597 B1 | 9/2008 |
| EP | 3211728 B1 | 10/2020 |

OTHER PUBLICATIONS

"Extended European Search Report dated Dec. 22, 2022", 11 Pages.

*Primary Examiner* — Gary F Paumen
(74) *Attorney, Agent, or Firm* — Billion & Armitage

(57) ABSTRACT

An electrical connector system includes a first connector body defining a locking fin, a second connector body configured to receive the first connector body, and a flexible locking arm defined by the second connector body configured to releasably engage the locking fin. A plunger is slidably attached to the second connector body and is moveable from an engaged position in which the plunger holds the locking arm in engagement with the locking fin to a disengaged position in which the plunger disengages the locking arm from the locking fin. A spring is disposed between the plunger and the second connector body and is configured to urge the plunger into the engaged position.

20 Claims, 17 Drawing Sheets

(56) References Cited

U.S. PATENT DOCUMENTS

| | | | | |
|---|---|---|---|---|
| 5,848,912 | A * | 12/1998 | Okabe | H01R 13/641 439/352 |
| 5,876,230 | A * | 3/1999 | Nishide | H01R 13/641 439/352 |
| 6,095,843 | A * | 8/2000 | Kaneko | H01R 13/6275 439/352 |
| 6,135,802 | A * | 10/2000 | Nakamura | H01R 13/641 439/138 |
| 6,224,414 | B1 * | 5/2001 | Fukuda | H01R 13/641 439/352 |
| 6,312,277 | B1 * | 11/2001 | Holub | H01R 13/641 439/352 |
| 6,341,973 | B1 * | 1/2002 | Endo | H01R 13/641 439/352 |
| 6,685,500 | B2 * | 2/2004 | Nakamura | H01R 13/635 439/352 |
| 6,948,956 | B2 | 9/2005 | Ngo | |
| 7,758,370 | B1 * | 7/2010 | Flaherty | H01R 13/6275 439/352 |
| 7,841,885 | B2 * | 11/2010 | Schmitt | H01R 13/6275 439/352 |
| 9,022,798 | B2 * | 5/2015 | Kida | H01R 13/506 439/358 |
| 9,466,916 | B2 | 10/2016 | Li et al. | |
| 10,312,623 | B2 | 6/2019 | Kim et al. | |
| 2002/0022393 | A1 * | 2/2002 | Saka | H01R 13/641 439/352 |
| 2004/0038569 | A1 | 2/2004 | Yamaoka et al. | |
| 2008/0009171 | A1 * | 1/2008 | Tsuji | H01R 13/6272 439/352 |
| 2008/0124966 | A1 * | 5/2008 | Lim | H01R 13/641 439/357 |
| 2012/0003858 | A1 * | 1/2012 | Gabrielsson | H01R 13/6275 439/352 |
| 2015/0056841 | A1 * | 2/2015 | Siwek | H01R 13/6271 439/352 |
| 2017/0062983 | A1 * | 3/2017 | Holub | H01R 13/6271 |
| 2019/0260150 | A1 | 8/2019 | Costello | |
| 2021/0249819 | A1 * | 8/2021 | Son | H01R 13/641 |

* cited by examiner

SELF-EJECTING ELECTRICAL CONNECTION SYSTEM

CROSS-REFERENCE TO RELATED APPLICATION

This application claims benefit of priority to U.S. Application No. 63/227,117 filed on Jul. 29, 2021, the entire disclosure of which is hereby incorporated by reference.

TECHNICAL FIELD

This disclosure is directed to an electrical connector with self-ejecting features.

BACKGROUND

Existing electrical connection systems with self-ejecting features do not totally guide the thrust member on the locking device. Locking devices made from plastic can fail over time due to polymer creep. Existing electrical connection systems typically require additional features in the male connector housing to provide self-ejection functions.

SUMMARY

According to one or more aspects of the present disclosure, an electrical connector system includes a first connector body defining a locking fin, a second connector body configured to receive the first connector body, and a flexible locking arm defined by the second connector body configured to releasably engage the locking fin. A plunger is slidably attached to the second connector body and is moveable from an engaged position in which the plunger holds the locking arm in engagement with the locking fin to a disengaged position in which the plunger disengages the locking arm from the locking fin. The electrical connector system also includes a spring disposed between the plunger and the second connector body. This spring is configured to urge the plunger into the engaged position.

In one or more embodiments of the electrical connector system according to the previous paragraph, a push surface on a flexible arm of the plunger contacts a forward end of the first connector body as the first connector body is engaged with the second connector body, thereby compressing the spring and moving the plunger from the engaged position to the disengaged position.

In one or more embodiments of the electrical connector system according to any one of the previous paragraphs, the second connector body is configured to bend the flexible arm such that the push surface no longer contacts the forward end of the first connector body as the plunger reaches the disengaged position, thereby allowing the plunger to return from the disengaged position to the engaged position.

In one or more embodiments of the electrical connector system according to any one of the previous paragraphs, compression of the spring causes the push surface on the flexible arm of the plunger to exert a force on the forward end of the first connector body when the push surface is in contact with the forward end of the first connector body, thereby urging the first and second connector bodies apart.

In one or more embodiments of the electrical connector system according to any one of the previous paragraphs, the second connector body defines a guide channel in which a portion of the flexible arm is disposed. The guide channel defines a ramp surface configured to bend the flexible arm such that the push surface no longer contacts the forward end of the first connector body as the plunger reaches the disengaged position.

In one or more embodiments of the electrical connector system according to any one of the previous paragraphs, the plunger defines a first tab having a first angled surface and the locking arm defines a second tab having a second angled surface. The first angled surface contacts the second angled surface as the plunger moves from the engaged position to the disengaged position, thereby lifting an end of the locking arm over the locking fin.

In one or more embodiments of the electrical connector system according to any one of the previous paragraphs, the first tab holds the end of the locking arm over the locking fin when the plunger is in the disengaged position.

In one or more embodiments of the electrical connector system according to any one of the previous paragraphs, the plunger is configured to lift the locking arm over the locking fin when the plunger is in the disengaged position.

In one or more embodiments of the electrical connector system according to any one of the previous paragraphs, the locking arm defines an aperture in which the locking fin is received when the plunger is in the engaged position.

In one or more embodiments of the electrical connector system according to any one of the previous paragraphs, the plunger and the second connector body are formed of a polymeric material. The electrical connector system further includes a metallic clip that is disposed within the second connector body. The spring is disposed between the plunger and the metallic clip.

In one or more embodiments of the electrical connector system according to any one of the previous paragraphs, the spring is compressed when the plunger is moved from the engaged position to the disengaged position.

In one or more embodiments of the electrical connector system according to any one of the previous paragraphs, the spring is relaxed when the plunger is in the engaged position.

In one or more embodiments of the electrical connector system according to any one of the previous paragraphs, a portion of the plunger blocks upward movement of the locking arm when the plunger is in the engaged position, thereby providing connector position assurance.

According to one or more aspects of the present disclosure, a method of connecting an electrical connector system which includes a first connector body defining a locking fin, a second connector body configured to receive the first connector body, a flexible locking arm defined by the second connector body configured to releasably engage the locking fin, a plunger slidably attached to the second connector body and moveable from an engaged position in which the plunger holds the locking arm in engagement with the locking fin to a disengaged position in which the plunger disengages the locking arm from the locking fin, and a spring disposed between the plunger and the second connector body and configured to urge the plunger into the engaged position includes the steps of:

- engaging the second connector body with the first connector body;
- moving the plunger from the engaged position to the disengaged position via contact between a push surface on a flexible arm of the plunger and a forward end of the first connector body as the first connector body is engaged with the second connector body;
- compressing the spring as the plunger moves from the engaged position to the disengaged position, thereby exerting a force on the forward end of the first connector body and urging the first and second connector bodies apart;

moving the flexible locking arm to a released position to pass by the locking fin as the plunger moves from the engaged position to the disengaged position;

bending the flexible arm such that the push surface no longer contacts the forward end of the first connector body as the plunger reaches the disengaged position;

moving the plunger from the disengaged position to the engaged position as the spring decompresses because the push surface is no longer in contact with the forward end of the first connector body; and lowering the locking arm over the locking fin such that the locking fin is received within an aperture within the locking arm as the plunger moves back to the engaged position, thereby securing the first connector body to the second connector body.

In one or more embodiments of the method according to the previous paragraph, the method further includes blocking upward movement of the locking arm by positioning a portion of the plunger over the locking arm when the plunger is in the engaged position, thereby providing connector position assurance.

In one or more embodiments of the method according to any one of the previous paragraphs, the spring is compressed when the plunger is moved from the engaged position.

In one or more embodiments of the method according to any one of the previous paragraphs, the spring is relaxed when the plunger is in the engaged position.

According to one or more aspects of the present disclosure, a method of disconnecting an electrical connector system which includes a first connector body defining a locking fin, a second connector body configured to receive the first connector body, a flexible locking arm defined by the second connector body configured to releasably engage the locking fin, a plunger slidably attached to the second connector body and moveable from an engaged position in which the plunger holds the locking arm in engagement with the locking fin to a disengaged position in which the plunger disengages the locking arm from the locking fin, and a spring disposed between the plunger and the second connector body and configured to urge the plunger into the engaged position includes the steps of:

moving the plunger from the engaged position to the disengaged position;

moving the flexible locking arm to a released position to pass by the locking fin as the plunger moves from the engaged position to the disengaged position;

compressing the spring as the plunger moves from the engaged position to the disengaged position;

withdrawing the first connector body from the second connector body; and moving the plunger from the disengaged position to the engaged position as the spring decompresses, thereby separating the first connector body from the second connector body via contact between a push surface on a flexible arm of the plunger and a forward end of the first connector body.

In one or more embodiments of the method according to the previous paragraph, the spring is compressed as the plunger is moved from the engaged position.

In one or more embodiments of the method according to any one of the previous paragraphs, the spring is relaxed when the plunger is in the engaged position.

DESCRIPTION OF THE DRAWINGS

The present invention will now be described, by way of example with reference to the accompanying drawings, in which.

DETAILED DESCRIPTION

This disclosure is directed to an electrical connector system in which two mating connectors are configured to self-eject or automatically separate unless completely and properly mated together. This self-ejecting feature helps to assure a proper connection is made and maintained between the mating connectors because an assembly operator is more likely to detect the separated connectors than partially mated connectors. One of the connectors includes a spring or a similar force generating device that is configured to urge the connectors apart until locking features in each of the mating connectors are properly engaged. The connector system further includes movable plunger locks and unlocks the locking features as it moved between an engaged position and a disengaged position. The plunger also includes a connector position assurance (CPA) feature that is configured to inhibit inadvertent unlocking and disconnection of the locking features when the plunger is in the engaged position. The plunger brings the spring to a relaxed condition when it is in the engaged position. The lock features can be manually disengaged using the plunger to disconnect the two mating connectors. When this occurs, the spring will urge the two mating connectors apart to break the electrical connection.

Figure 1:
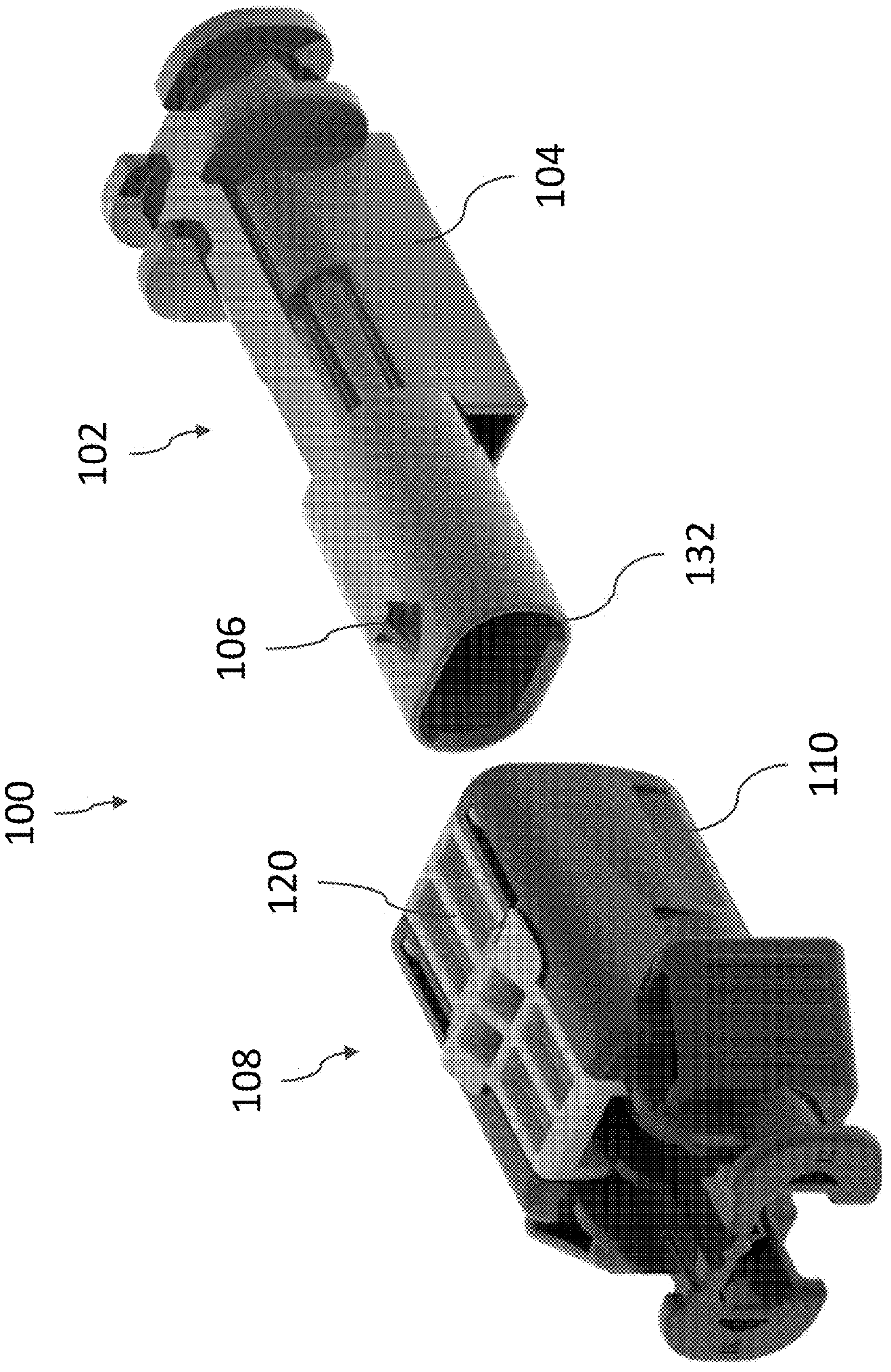
FIG. 1 is a perspective view of an electrical connector assembly in a disconnected condition according to some embodiments.
Figure 2:
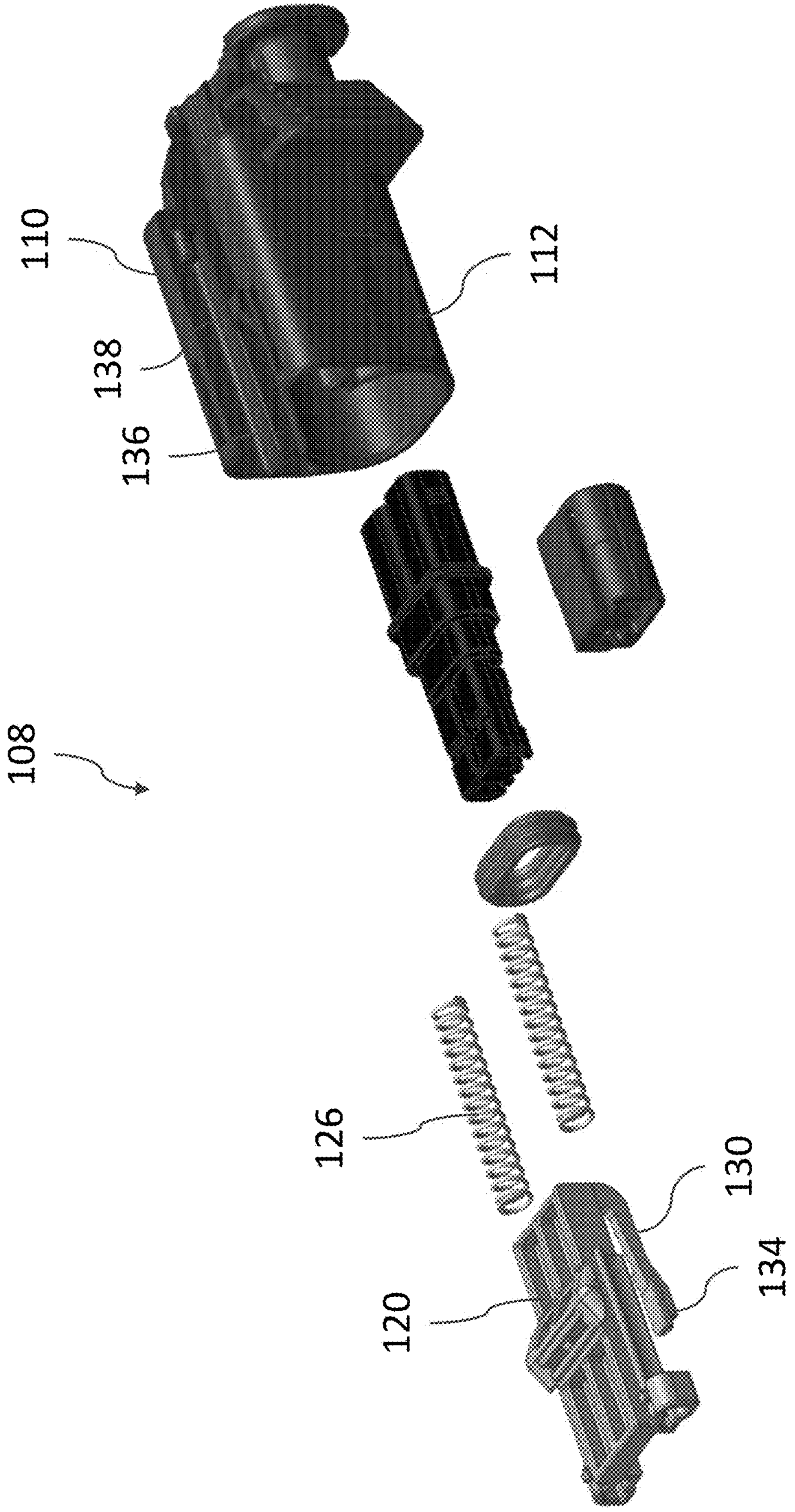
FIG. 2 is an exploded view of one of the electrical connectors according to some embodiments.
Figure 9:
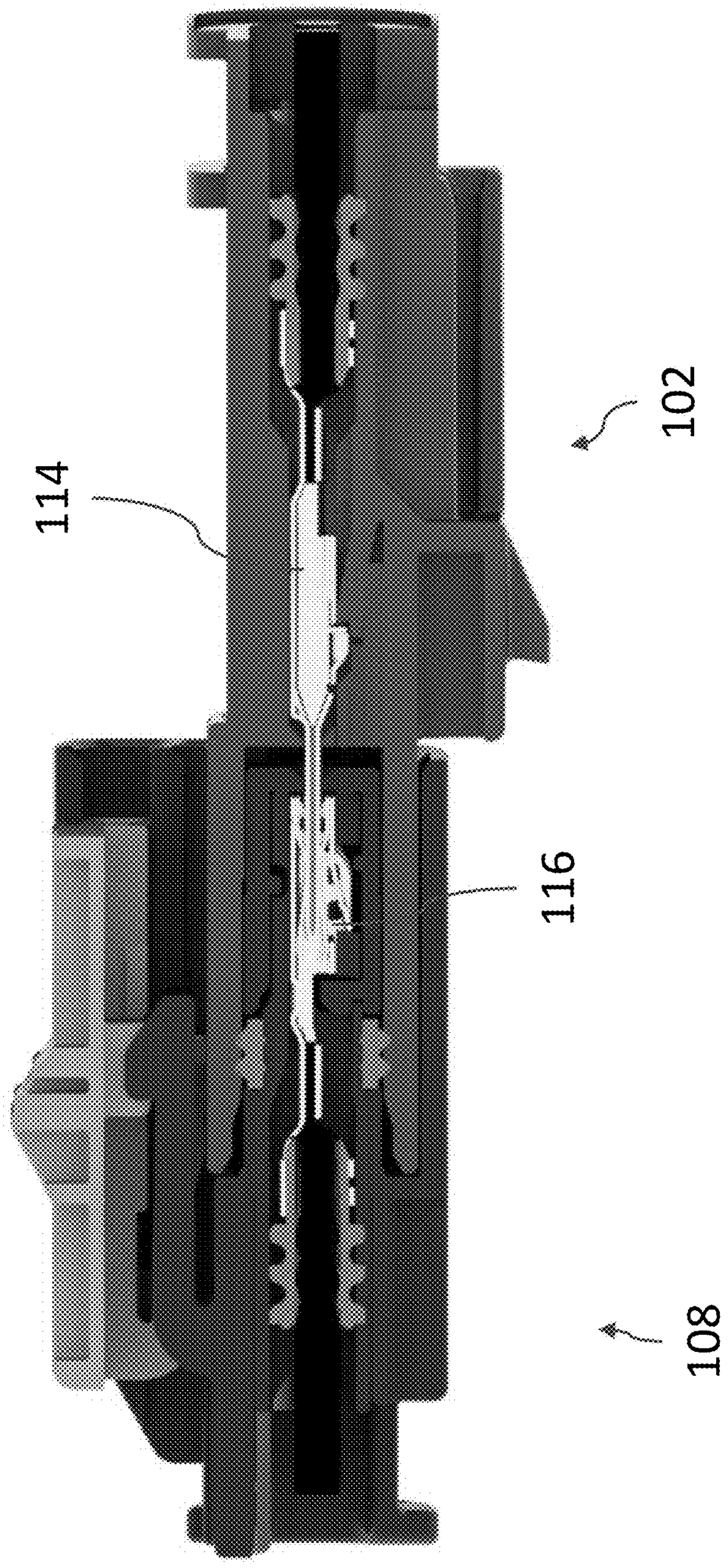
FIG. 9 is a cross-section side view of the electrical connector assembly during an initial stage of disconnection of the electrical connector assembly according to some embodiments.

A non-limiting example of such an electrical connector system 100 is illustrated in FIG. 1. The electrical connector system includes a first connector 102, in this example a male connector, having a first connector body 104 formed of an electrically insulative material. The first connector body 104 defines a locking fin 106 near a forward edge of the first connector body 104. As used herein, forward and rearward directions are referenced in relation to a longitudinal axis of the first connector 102 in the direction in which the first connector 102 is engaged with a second mating connector 108 of the electrical connector system 100. The locking fin 106 has an acutely angled surface relative to the first connector body 104 on its forward face and a perpendicular surface on its rearward face. The second connector 108, in this example a female connector and shown in more detail in FIG. 2, has a second connector body 110 that defines a shroud 112 configured to receive the first connector body 104. The first connector 102 includes a plurality of electrical terminals 114 disposed within the first connector body 104 that are designed to mate with a plurality of corresponding mating electrical terminals 116 disposed within the second connector body 110 of the second connector 108 as best shown in FIG. 9.

The second connector body 110 includes a flexible locking arm 118 that is configured to releasably engage the locking fin 106 in order to maintain a connection between the first and second connector bodies 104, 110 and thereby maintain a connection between the electrical terminals 114 in the first connector body 104 and the mating electrical terminals 116 in the second connector body 110 of the second connector 108.

The second connector 108 also includes a plunger 120 that is slidably attached to the second connector body 110. The plunger 120 is moveable from an engaged position 122 in which the plunger 120 holds the locking arm 118 in engagement with the locking fin 106 to a disengaged position 124 in which the plunger 120 disengages the locking arm 118 from the locking fin 106.

Figure 3B:
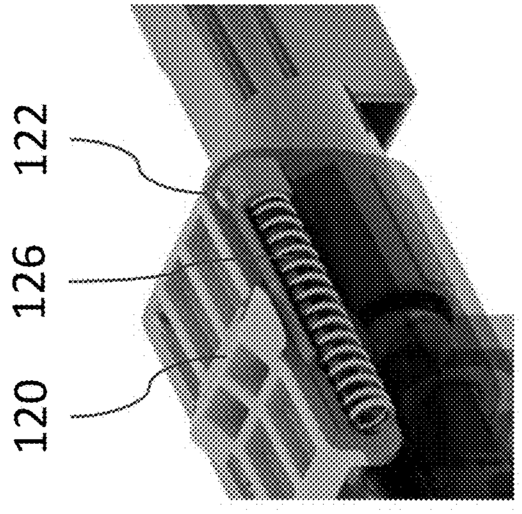
FIG. 3B is a cut-away perspective view of the electrical connector assembly during the initial stage of connection of the electrical connector assembly shown in FIG. 3A showing the condition of a spring between the second connector body and the plunger according to some embodiments.
Figure 3A:
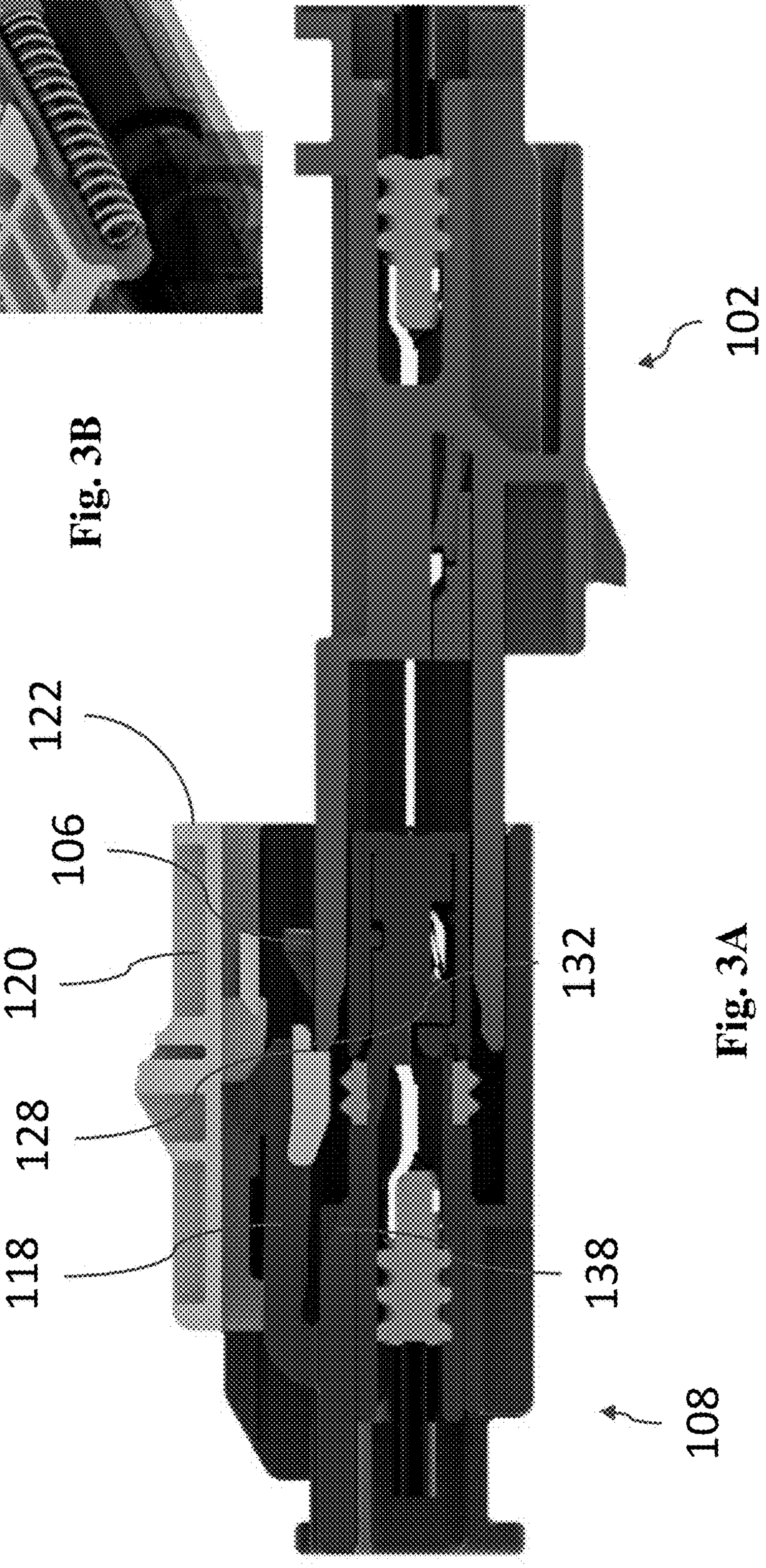
FIG. 3A is a cross-section side view of the electrical connector assembly during an initial stage of connection of the electrical connector assembly when a forward end of the first connector body contacts a push surface of a plunger in the second connector body according to some embodiments.

The second connector 108 further includes a pair of compression coil springs 126 disposed between the plunger 120 and the second connector body 110. These springs 126 are configured to urge the plunger 120 into the engaged position 122. In alternative embodiments, these springs may be replaced by other types of springs that urge the plunger 120 into the engaged position 122, for example leaf compression springs, polymeric compression springs, pneumatic compression springs, or extension springs. A push surface 128 on a fore end of a flexible arm 130 of the plunger 120 contacts a forward end 132 of the first connector body 104 as the first connector body 104 is engaged with the second connector body 110, thereby compressing the springs 126 and moving the plunger 120 from the engaged position 122 to the disengaged position 124 as shown in FIGS. 3A and 4A. The compression of the springs 126 exert a force between the first and second connector bodies 104, 110 that push the first and second connectors 102, 108 apart. This force is overcome by the application of a counteracting force applied to the first and second connectors 102, 108 by an assembly operator as the first and second connectors 102, 108 are mated. As used herein, fore and aft directions are referenced in relation to a longitudinal axis of the second connector 108 in the direction in which the second connector 108 is mated with the first connector 102.

Figure 16B:
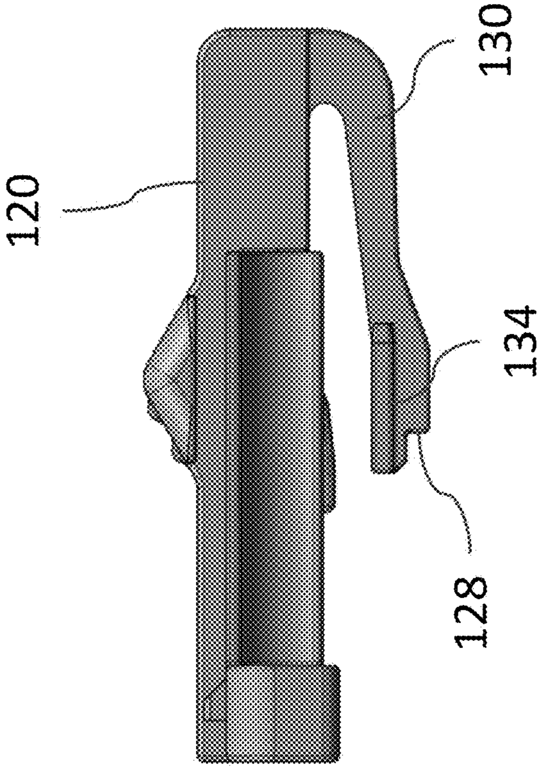
FIG. 16B is a side view of the plunger according to some embodiments.
Figure 16A:
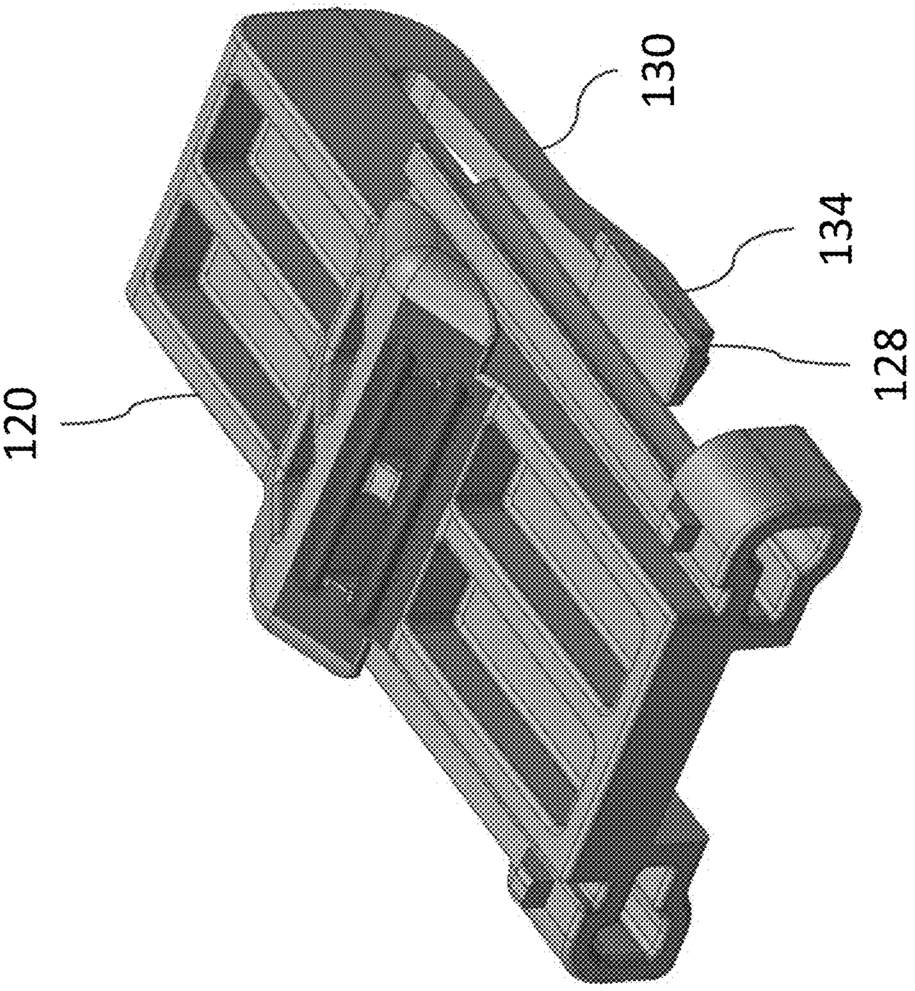
FIG. 16A is a perspective view of a plunger of the electrical connector assembly according to some embodiments.

A portion 134 of the flexible arm 130, best illustrated in FIGS. 16A and 16B, is disposed within a guide channel 136 in the second connector body 110 and a rearward end of this guide channel 136 defines an angled ramp feature 138. When the plunger 120 is pulled back to the disengaged position 124 as shown in FIG. 5A, the ramp feature 138 bends the flexible arm 130 upward so that the push surface 128 no longer contacts the forward end 132 of the first connector body 104 as shown in FIG. 6A. This allows the plunger 120 to return from the disengaged position 124 toward the engaged position 122.

As shown in FIG. 4A, the plunger 120 defines a first tab 140 having a first angled surface 142 on its aft end and the locking arm 118 defines a second tab 144 having a second angled surface 146 on its fore end. As shown in FIG. 4A, the first angled surface 142 contacts the second angled surface 146 as the plunger 120 moves from the engaged position 122 to the disengaged position 124 and lifts the fore end of the locking arm 118 over the locking fin 106 if the first connector body 104. The first tab 140 lifts and holds the fore end of the locking arm 118 over the locking fin 106 when the plunger 120 is in the disengaged position 124, thereby disengaging the locking arm 118 from the locking fin 106 and allowing the first connector body 104 to be separated and removed from the second connector body 110.

Figure 7:
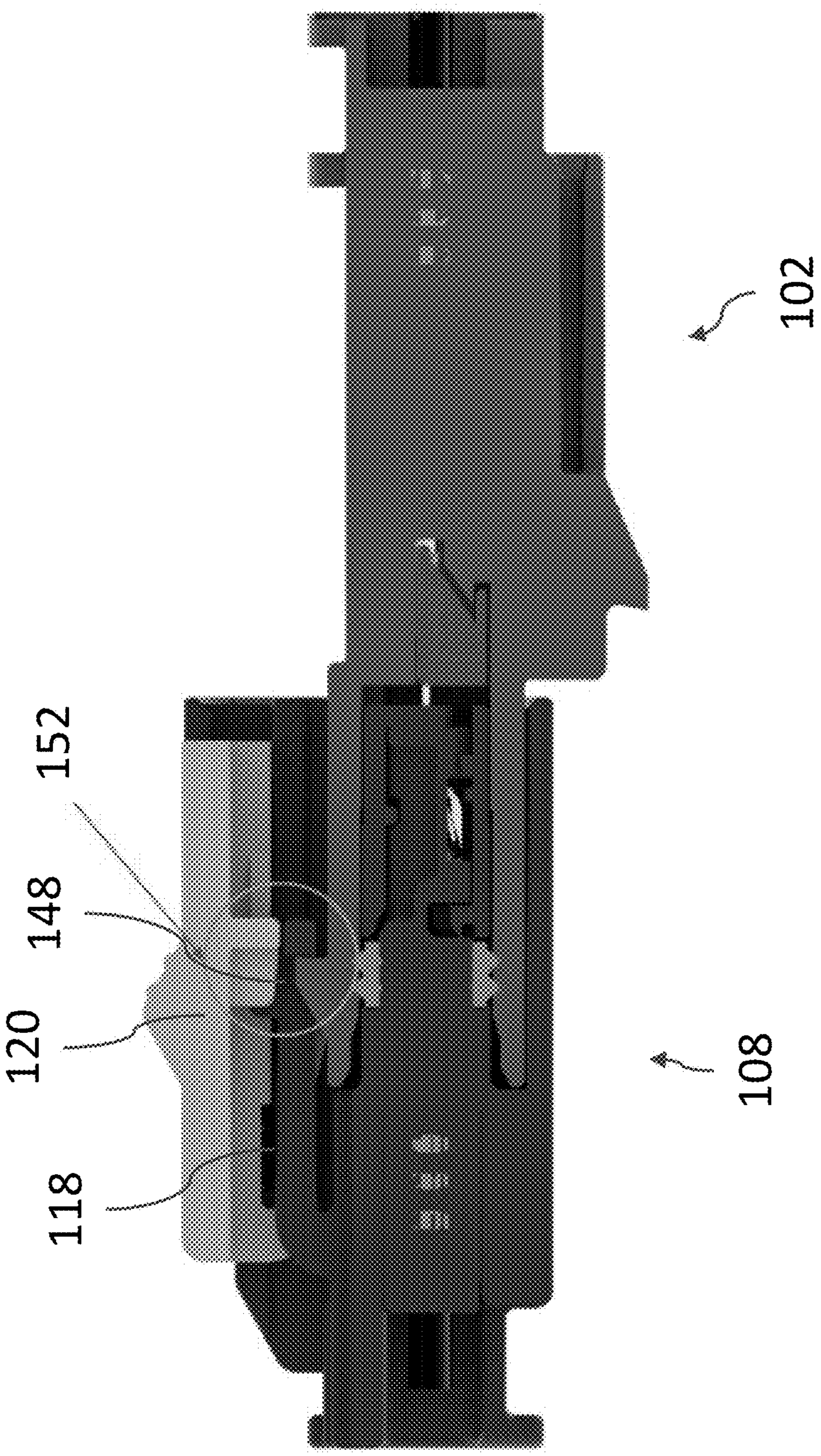
FIG. 7 is a cross-section side view of the electrical connector assembly showing a portion of the plunger that is configured to inhibit disengagement between the locking arm and the locking fin while the plunger is in the engaged position according to some embodiments.

The locking arm 118 defines an aperture 148 in which the locking fin 106 is received after the plunger 120 is moved from the disengaged position 124 the engaged position 122 and the first tab 140 is no longer engaged with the second tab 144 as shown in FIG. 7.

The springs 126 are compressed when the plunger 120 is moved from the engaged position 122 to the disengaged position 124 and are relaxed when the plunger 120 is in the engaged position 122 as shown in FIGS. 3B, 4B, 5B, and 6B.

Figure 17:
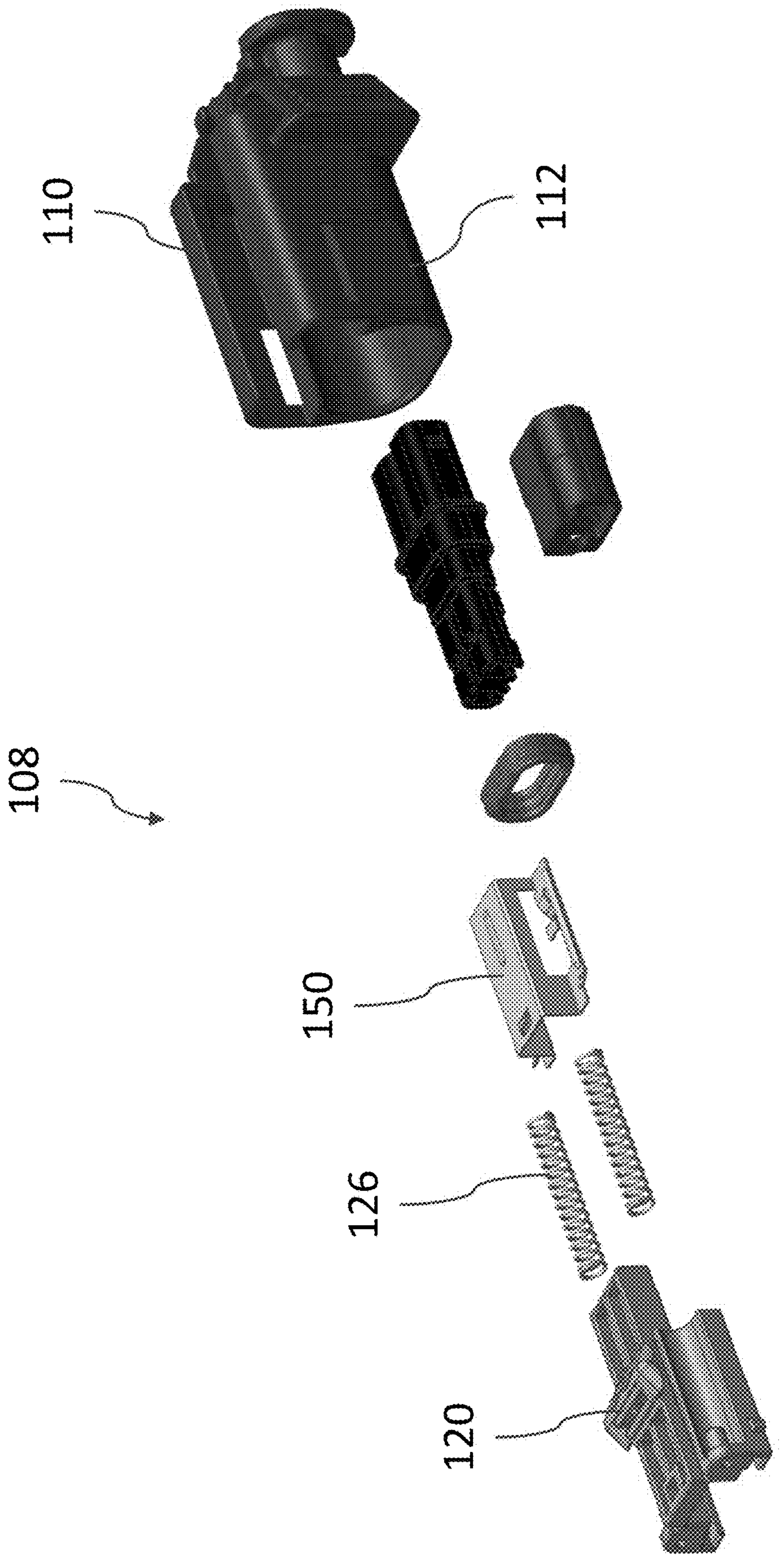
FIG. 17 is an exploded view of one of the electrical connectors according to an alternative embodiment.

The plunger 120 and the second connector body 110 are formed of a polymeric material. In an alternative embodiment shown in FIG. 17, the electrical connector system 100 further comprises a metallic clip 150 that is disposed within the second connector body 110. The springs 126 are disposed between the plunger 120 and the metallic clip 150. The metallic clip provides the benefit of reducing the amount of polymer creep in the second connector body 110 that may occur over time.

A portion 152 of the plunger 120 is configured to block upward movement of the locking arm 118 when the plunger 120 is in the engaged position 122, thereby providing a connector position assurance function.

Figure 8:
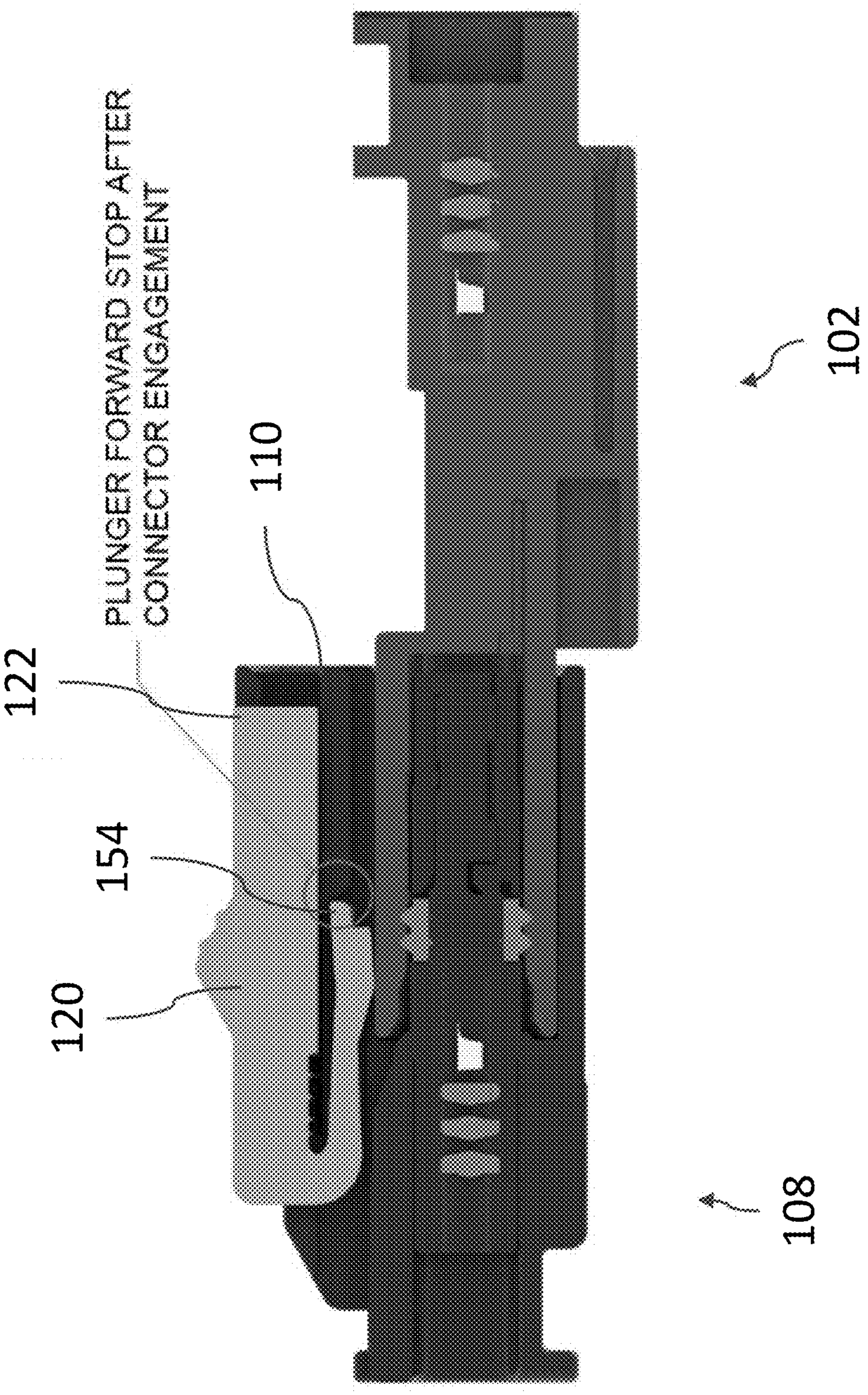
FIG. 8 is a cross-section side view of the electrical connector assembly showing a portion of the second connector body that forms a forward stop configured to inhibit movement of the plunger forward of the engaged position according to some embodiments.

The forward end 154 of the plunger 120 may contact the second connector body 110 to prevent the plunger 120 from moving beyond the engaged position 122 as illustrated in FIG. 8.

Figure 4B:
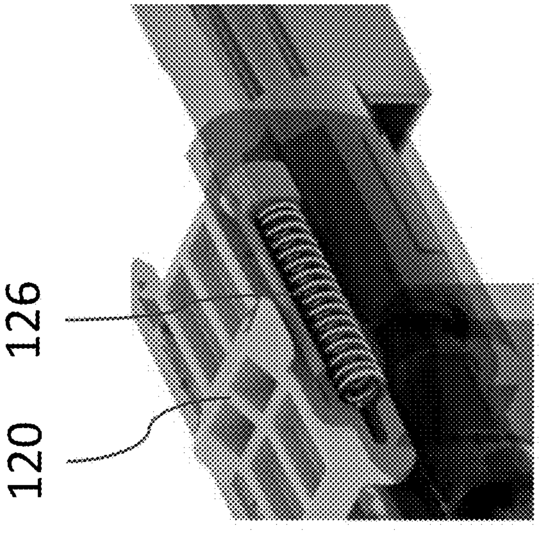
FIG. 4B is a cut-away perspective view of the electrical connector assembly during the stage of connection of the electrical connector assembly shown in FIG. 4A showing the condition of the spring between the second connector body and the plunger according to some embodiments.
Figure 4A:
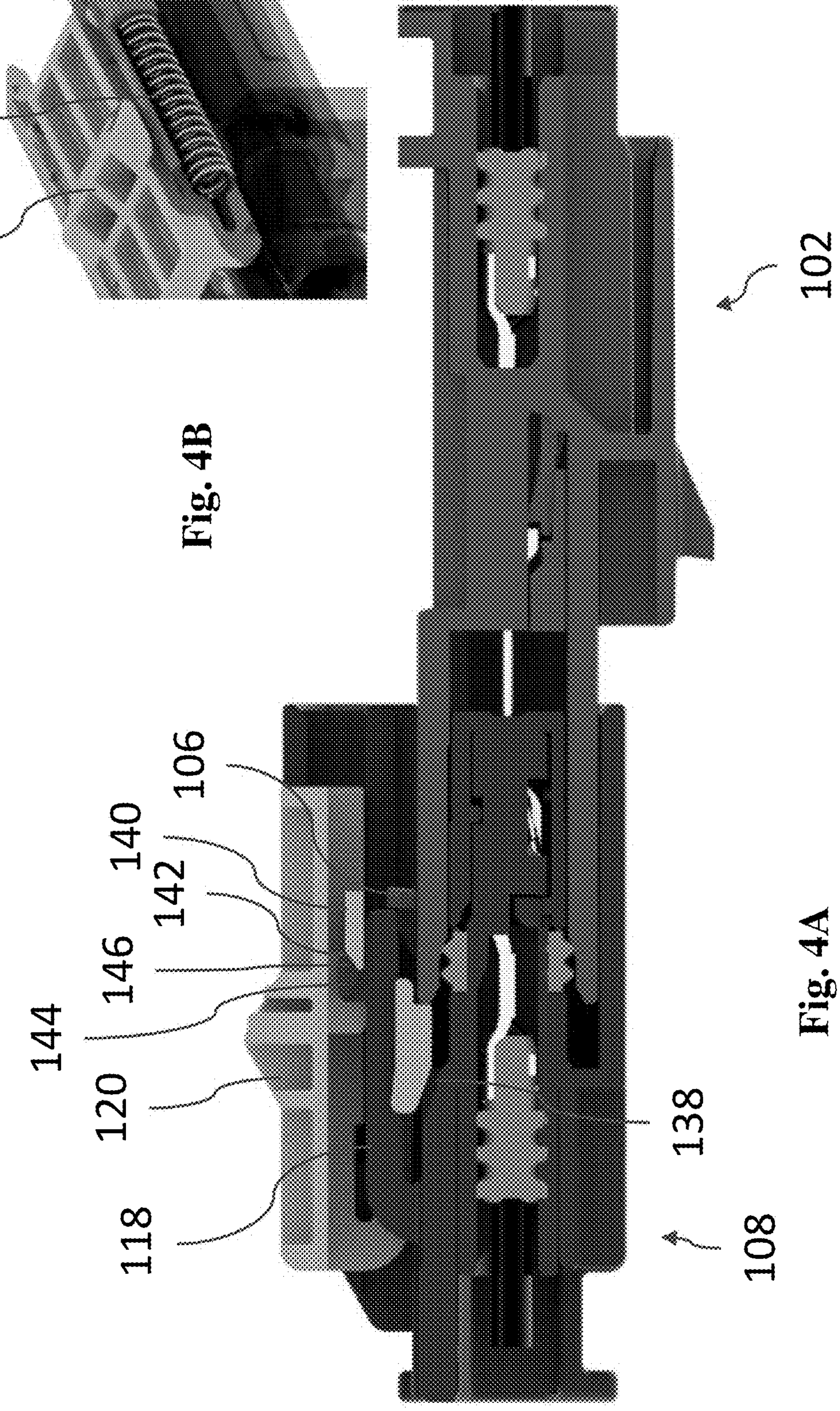
FIG. 4A is a cross-section side view of the electrical connector assembly during a stage of connection of the electrical connector assembly subsequent to the initial stage shown in FIG. 3A when the plunger is moved from an engaged position toward a disengaged position according to some embodiments.
Figure 5B:
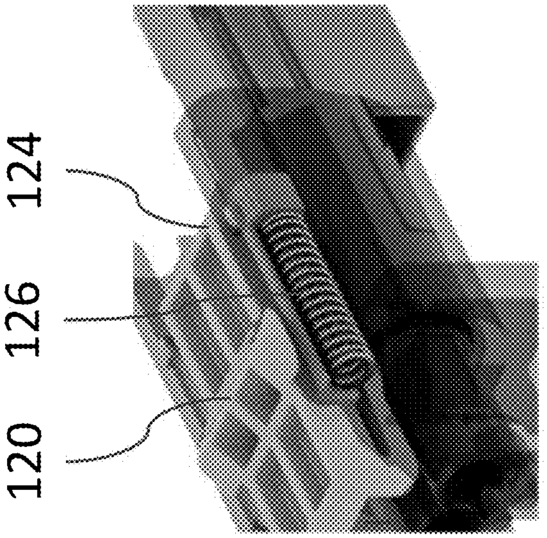
FIG. 5B is a cut-away perspective view of the electrical connector assembly during the stage of connection of the electrical connector assembly shown in FIG. 5A showing the condition of the spring between the second connector body and the plunger according to some embodiments.
Figure 5A:
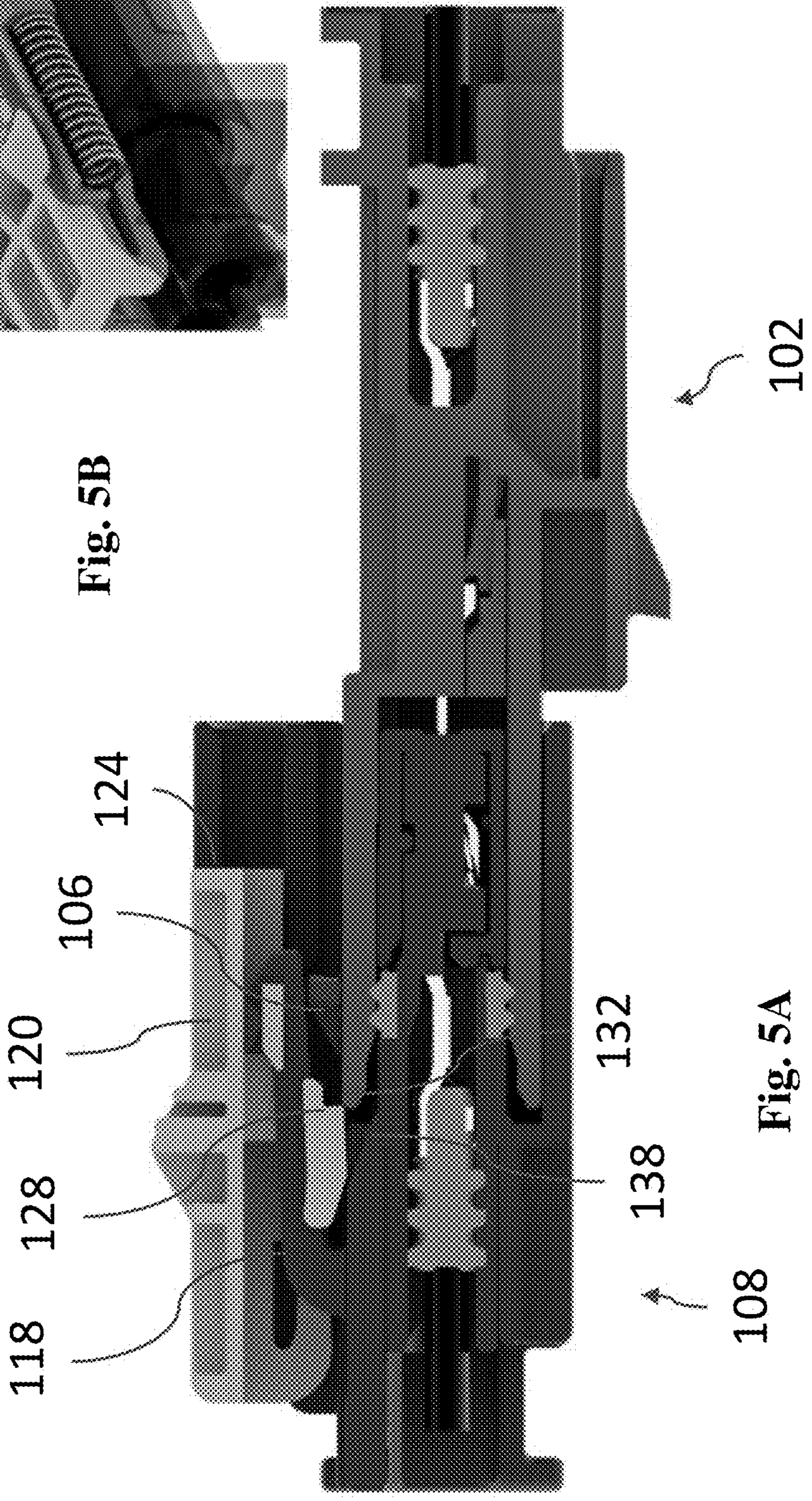
FIG. 5A is a cross-section side view of the electrical connector assembly during a stage of connection of the electrical connector assembly subsequent to the stage shown in FIG. 4A when a ramp in the second connector body moves the push surface of a plunger out of contact with the forward end of the first connector body and the plunger lifts a locking arm in the second connector body over a locking fin on the first connector body while the plunger is in the disengaged position according to some embodiments.
Figure 6B:
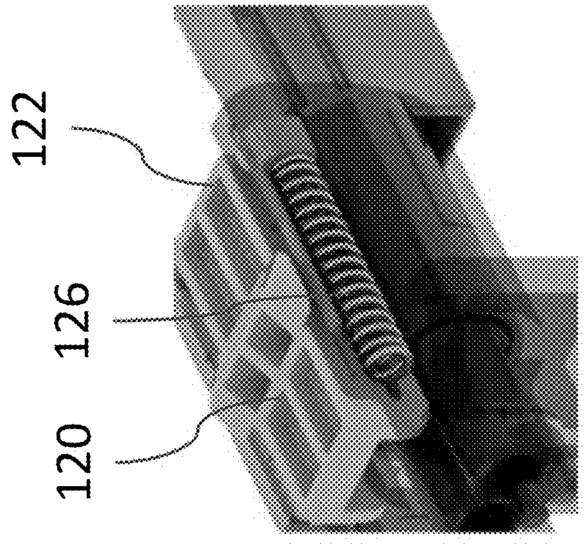
FIG. 6B is a cut-away perspective view of the electrical connector assembly during the final stage of connection of the electrical connector assembly shown in FIG. 6A showing the condition of the spring between the second connector body and the plunger according to some embodiments.
Figure 6A:
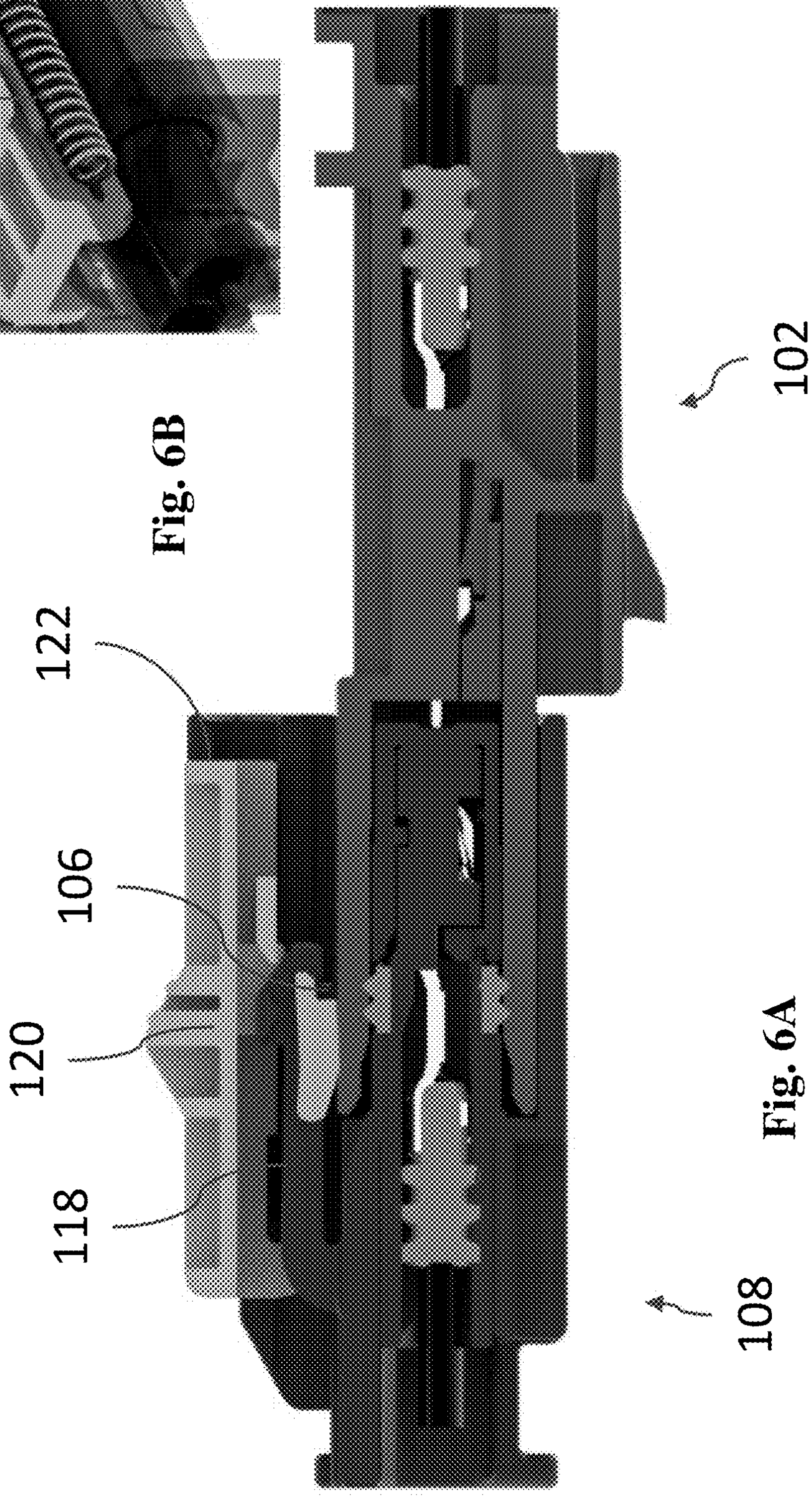
FIG. 6A is a cross-section side view of the electrical connector assembly during a final stage of connection of the electrical connector assembly subsequent to the stage shown in FIG. 5A when the plunger lowers the locking arm onto the locking fin as the plunger returns to the engaged position according to some embodiments.

A method of connecting the electrical connector system described above includes the steps of:

engaging the second connector body 110 with the first connector body 104 as shown in FIG. 3A;

moving the plunger 120 from the engaged position 122 to the disengaged position 124 via contact between a push surface 128 on a flexible arm 130 of the plunger 120 and a forward end 132 of the first connector body 104 as the first connector body 104 is engaged with the second connector body 110 as shown in FIGS. 4A and 5A;

compressing the springs 126 as the plunger 120 moves from the engaged position 122 to the disengaged position 124, thereby exerting a force on the forward end 132 of the first connector body 104 and urging the first and second connector bodies 104, 110 apart as shown in FIGS. 4B and 5B;

moving the flexible locking arm 118 to a released position to pass by the locking fin 106 as the plunger 120 moves from the engaged position 122 to the disengaged position 124 as shown in FIG. 5A;

bending the flexible arm 130 such that the push surface 128 no longer contacts the forward end 132 of the first connector body 104 as the plunger 120 reaches the disengaged position 124 as shown in FIG. 5A;

moving the plunger 120 from the disengaged position 124 to the engaged position 122 as the springs 126 decompress because the push surface 128 is no longer in contact with the forward end 132 of the first connector body 104 as shown in FIGS. 6A and 6B; and lowering the locking arm 118 over the locking fin 106 such that the locking fin 106 is received within an aperture 148 within the locking arm 118 as the plunger 120 moves back to the engaged position 122, thereby securing the first connector body 104 to the second connector body 110 as shown in FIG. 6A.

The method also may include the step of blocking upward movement of the locking arm 118 by positioning a portion 152 of the plunger 120 over the locking arm 118 when the plunger 120 is in the engaged position 122, thereby providing connector position assurance as shown in FIG. 7.

The springs 126 are compressed as the plunger 120 is moved from the engaged position 122 and are relaxed when the plunger 120 is in the engaged position 122 as shown in FIGS. 3B, 4B, 5B, and 6B.

Figure 10:
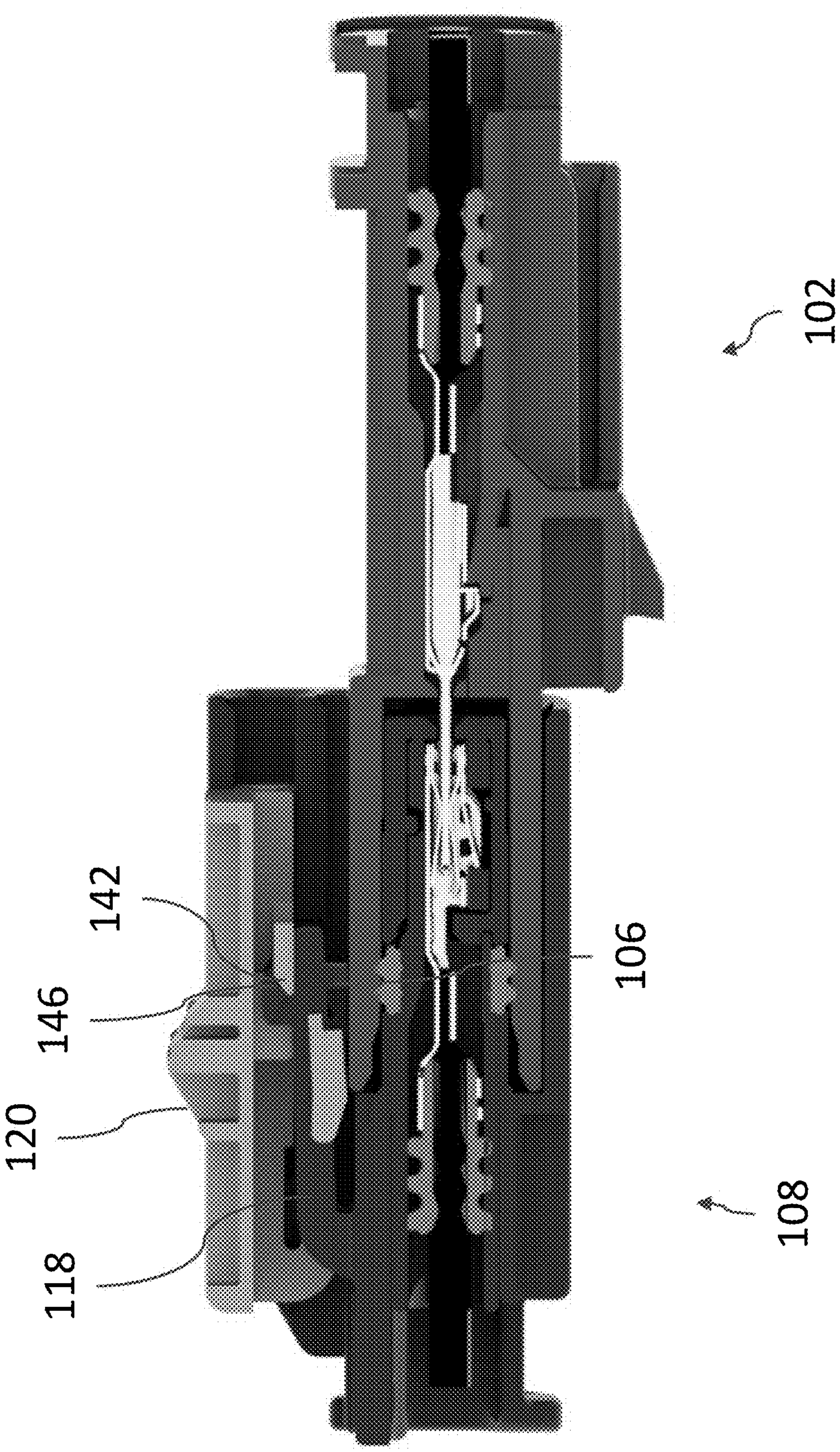
FIG. 10 is a cross-section side view of the electrical connector assembly during a stage of disconnection of the electrical connector assembly subsequent to the initial stage shown in FIG. 9 when the plunger is moved from the engaged position toward the disengaged position according to some embodiments.
Figure 11:
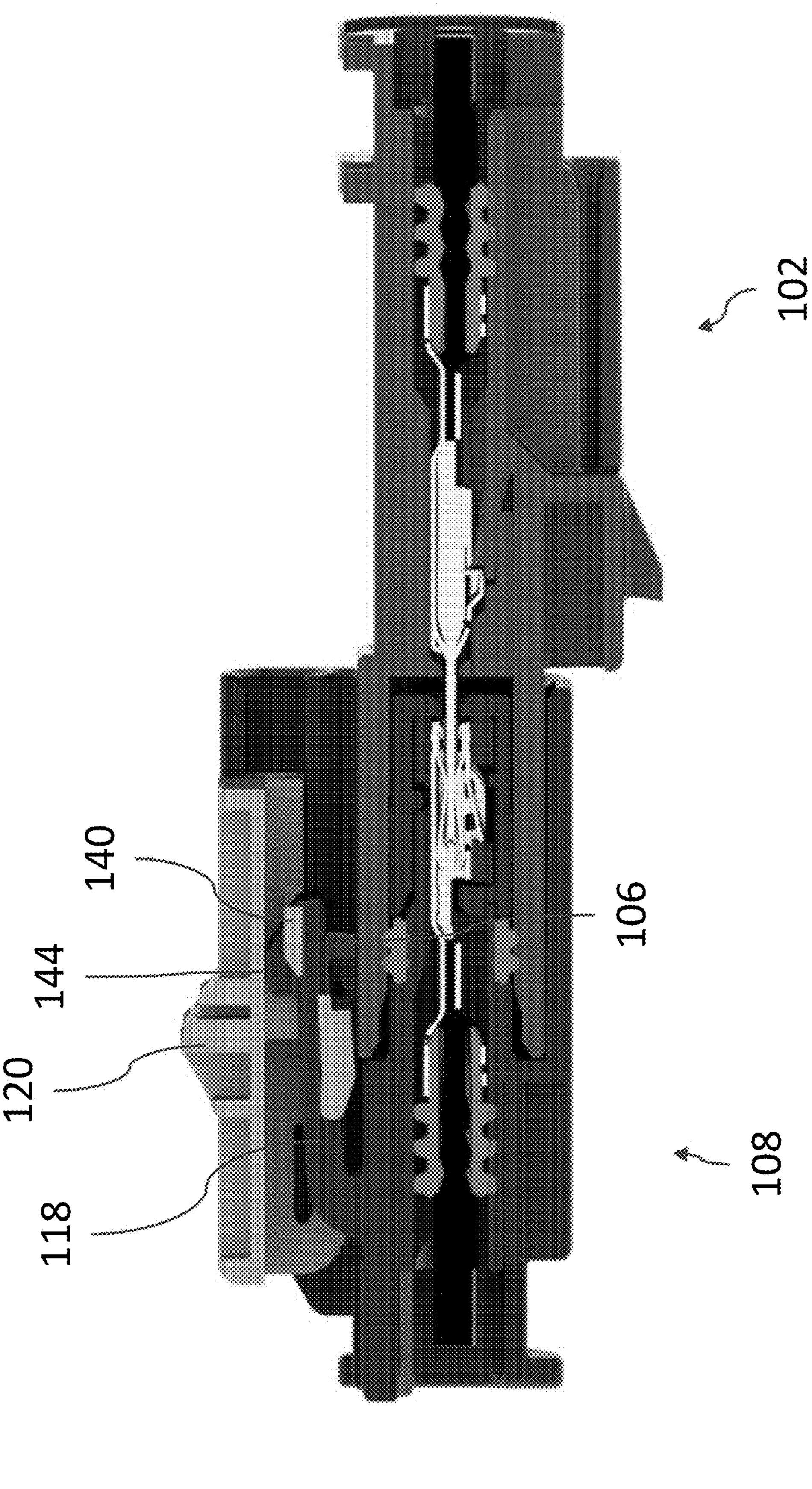
FIG. 11 is a cross-section side view of the electrical connector assembly during a stage of disconnection of the electrical connector assembly subsequent to the stage shown in FIG. 10 when the plunger lifts a locking arm in the second connector body over a locking fin on the first connector body according to some embodiments.
Figure 12B:
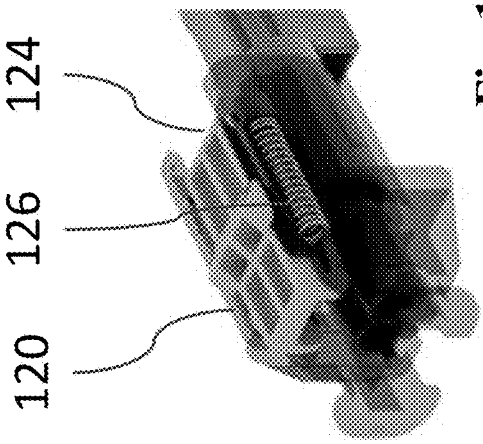
FIG. 12B is a cut-away perspective view of the electrical connector assembly during the stage of connection of the electrical connector assembly shown in FIG. 12A showing the condition of the spring between the second connector body and the plunger according to some embodiments.
Figure 12A:
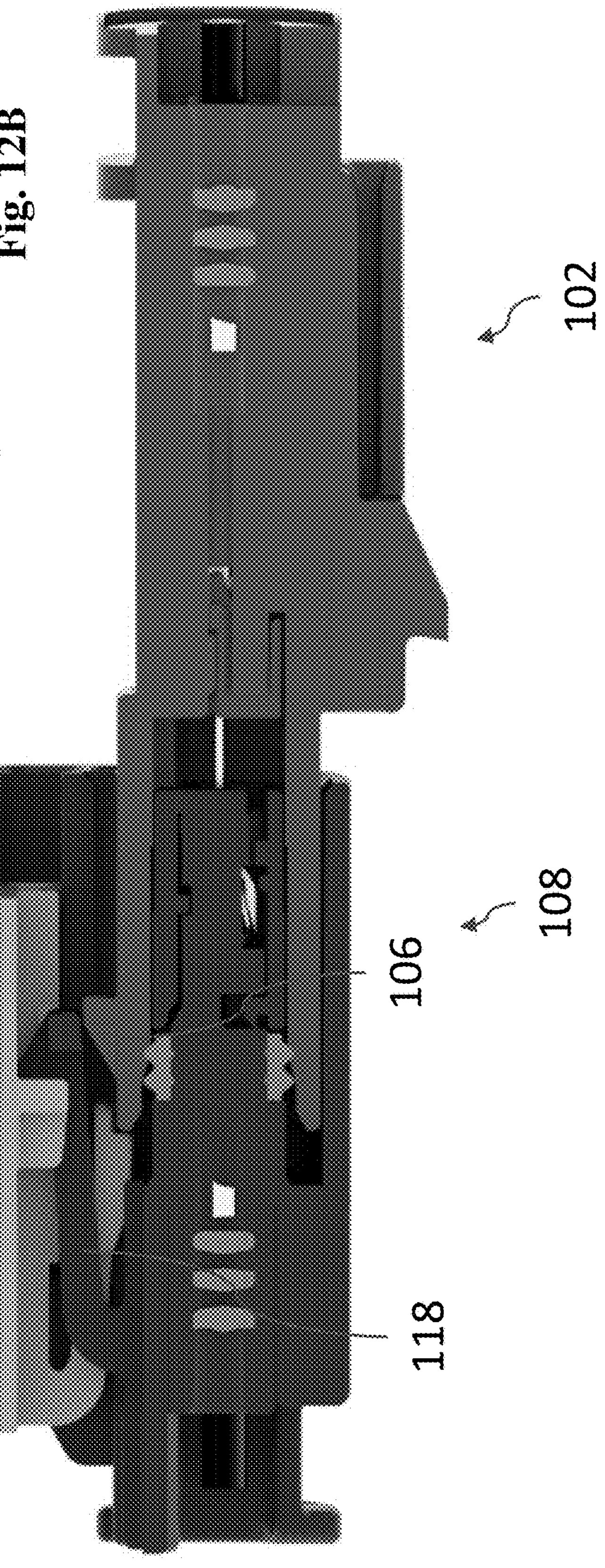
FIG. 12A is a cross-section side view of the electrical connector assembly during a stage of disconnection of the electrical connector assembly subsequent to the stage shown in FIG. 11 when the plunger is in the disengaged position according to some embodiments.
Figure 13B:
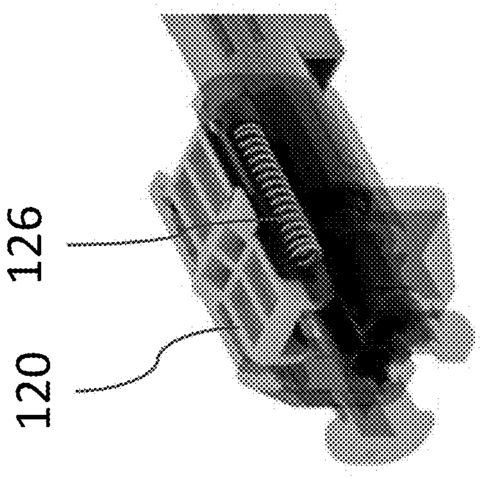
FIG. 13B is a cut-away perspective view of the electrical connector assembly during the stage of disconnection of the electrical connector assembly shown in FIG. 13A showing the condition of the spring between the second connector body and the plunger according to some embodiments.
Figure 13A:
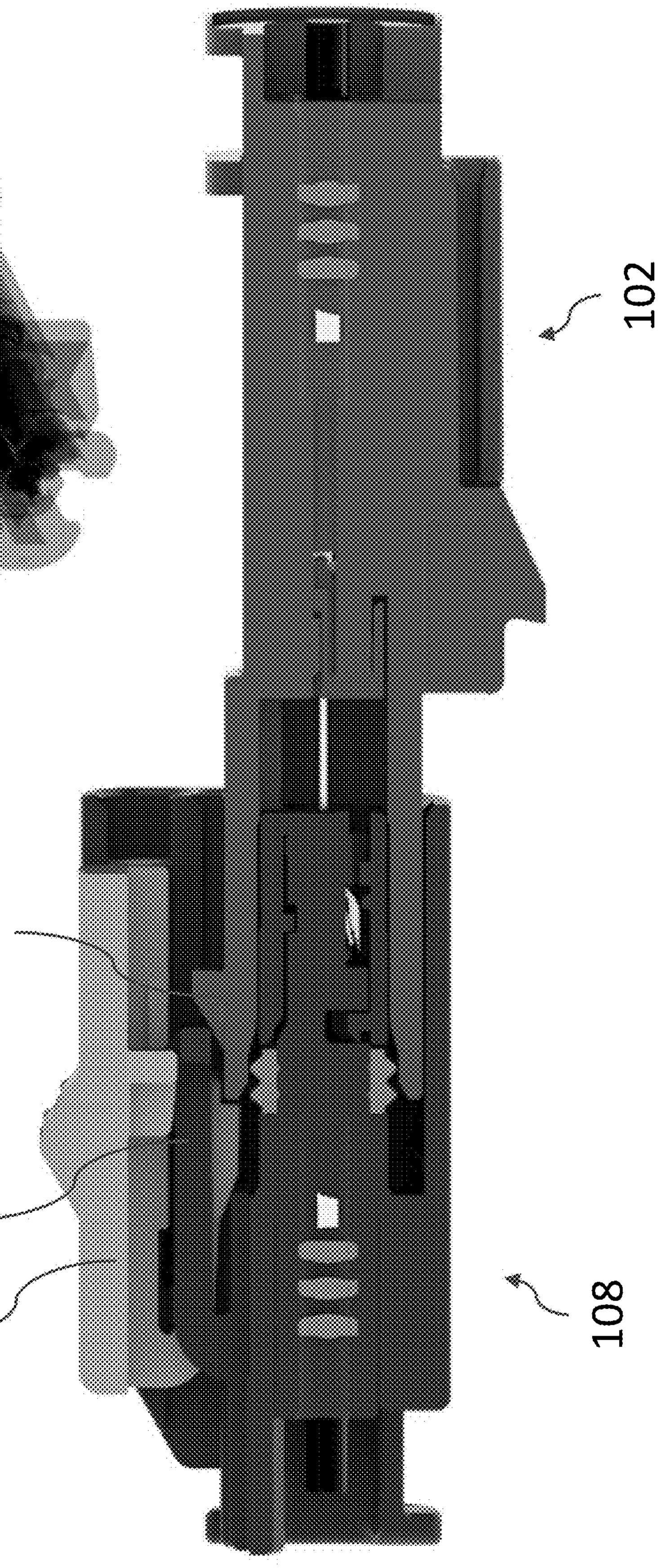
FIG. 13A is a cross-section side view of the electrical connector assembly during a stage of disconnection of the electrical connector assembly subsequent to the stage shown in FIG. 12A when the plunger moves toward the disengaged position as the first connector body is withdrawn from the second connector body according to some embodiments.
Figure 14B:
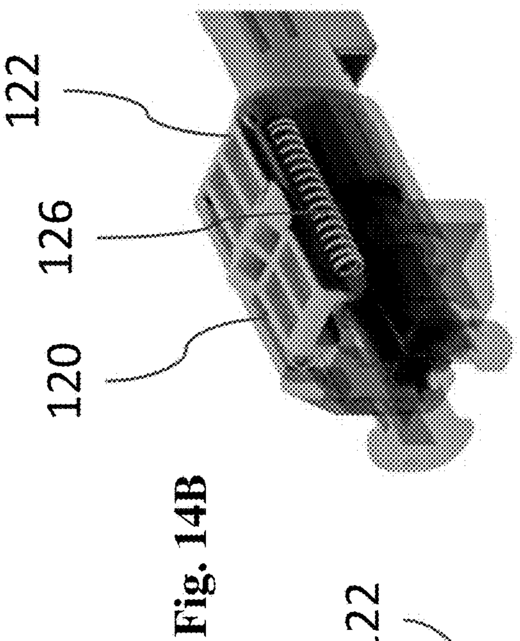
FIG. 14B is a cut-away perspective view of the electrical connector assembly during the stage of disconnection of the electrical connector assembly shown in FIG. 14A showing the condition of the spring between the second connector body and the plunger according to some embodiments.
Figure 14A:
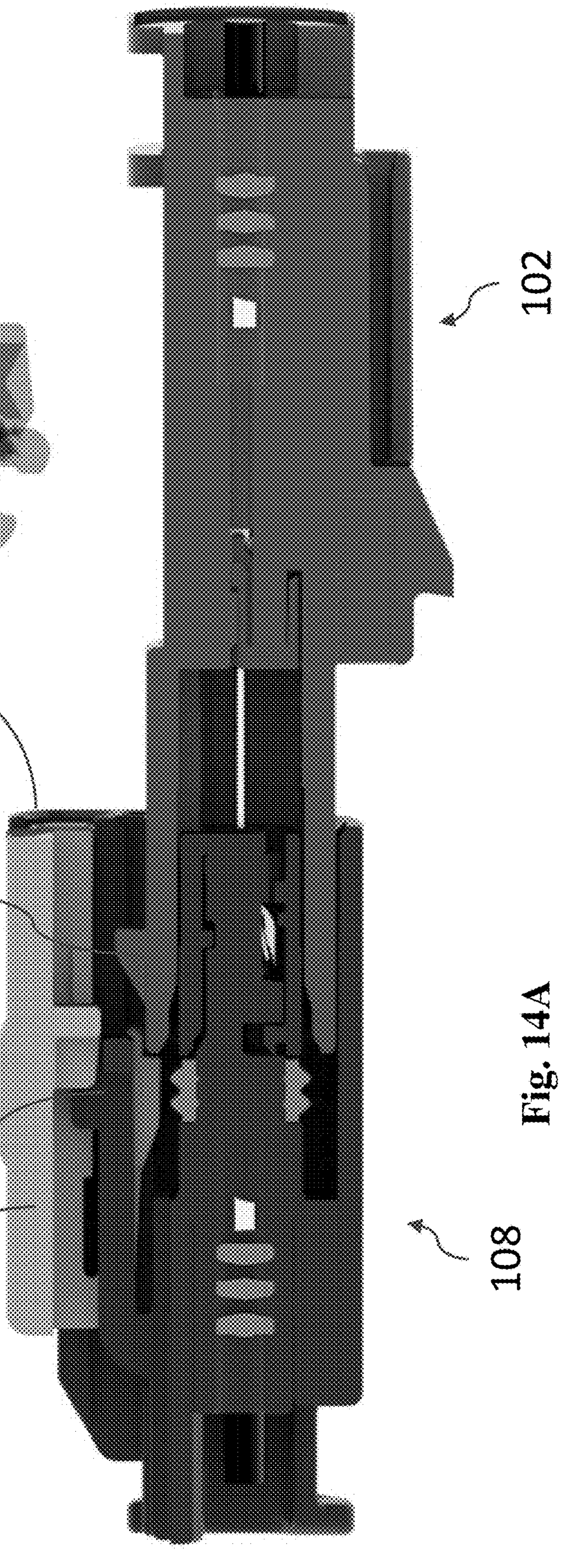
FIG. 14A is a cross-section side view of the electrical connector assembly during a stage of disconnection of the electrical connector assembly subsequent to the stage shown in FIG. 13B when the plunger returns to the engaged position as the first connector body is withdrawn from the second connector body according to some embodiments.
Figure 15:
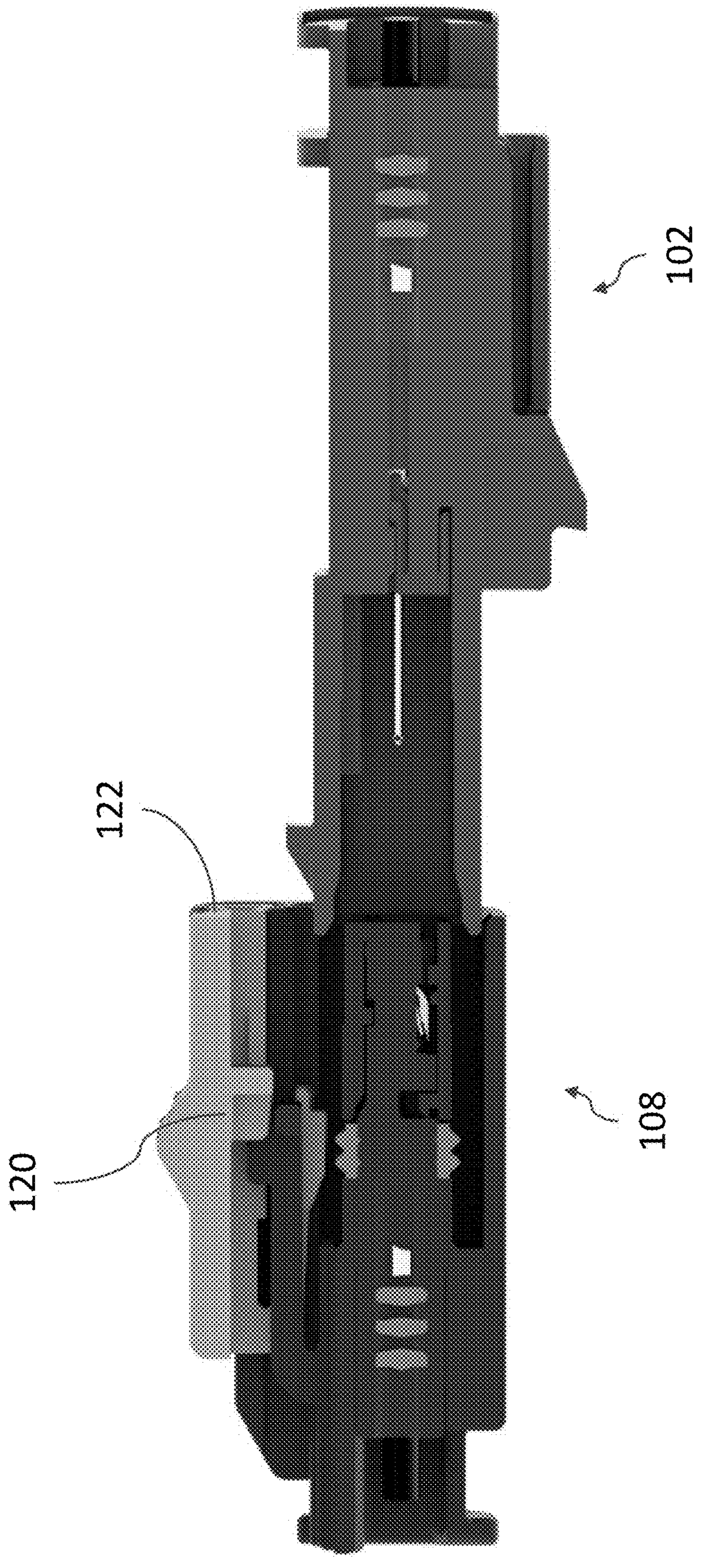
FIG. 15 is a cut-away perspective view of the electrical connector assembly during the final stage of disconnection of the electrical connector assembly according to some embodiments

A method of disconnecting the electrical connector system described above includes the steps of:

moving the plunger 120 from the engaged position 122 to the disengaged position 124 as shown in FIGS. 9 and 10;

moving the flexible locking arm 118 to a released position to pass by the locking fin 106 as the plunger 120 moves from the engaged position 122 to the disengaged position 124 as shown in FIG. 11;

compressing the springs 126 as the plunger 120 moves from the engaged position 122 to the disengaged position 124 as shown in FIG. 12B;

withdrawing the first connector body 104 from the second connector body 110 as shown in FIGS. 14A and 15; and moving the plunger 120 from the disengaged position 124 to the engaged position 122 as the springs 126 decompress as shown in FIGS. 12A, 12B, 13A, 13B, 14A, and 14B, thereby separating the first connector body 104 from the second connector body 110 via contact between a push surface 128 on a flexible arm 130 of the plunger 120 and a forward end 132 of the first connector body 104.

The springs 126 are compressed as the plunger 120 is moved from the engaged position 122 and relaxed when the plunger 120 is in the engaged position 122 as shown in FIGS. 12B, 13B, and 14B.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector system, comprising:

a first connector body defining a locking fin;

a second connector body configured to receive the first connector body;

a flexible locking arm defined by the second connector body configured to releasably engage the locking fin;

a plunger slidably attached to the second connector body and moveable from an engaged position in which the plunger holds the locking arm in engagement with the locking fin to a disengaged position in which the plunger disengages the locking arm from the locking fin; and a spring disposed between the plunger and the second connector body and configured to urge the plunger into the engaged position.

2. The electrical connector system according to claim 1, wherein a push surface on a flexible arm of the plunger contacts a forward end of the first connector body as the first connector body is engaged with the second connector body, thereby compressing the spring and moving the plunger from the engaged position to the disengaged position.

3. The electrical connector system according to claim 2, wherein the second connector body is configured to bend the flexible arm such that the push surface no longer contacts the forward end of the first connector body as the plunger reaches the disengaged position, thereby allowing the plunger to return from the disengaged position to the engaged position.

4. The electrical connector system according to claim 2, wherein compression of the spring causes the push surface on the flexible arm of the plunger to exert a force on the forward end of the first connector body when the push surface is in contact with the forward end of the first connector body, thereby urging the first and second connector bodies apart.

5. The electrical connector system according to claim 2, wherein the second connector body defines a guide channel in which a portion of the flexible arm is disposed and wherein the guide channel defines a ramp surface configured to bend the flexible arm such that the push surface no longer contacts the forward end of the first connector body as the plunger reaches the disengaged position.

6. The electrical connector system according to claim 1, wherein the plunger defines a first tab having a first angled surface and the locking arm defines a second tab having a second angled surface and wherein the first angled surface contacts the second angled surface as the plunger moves from the engaged position to the disengaged position, thereby lifting an end of the locking arm over the locking fin.

7. The electrical connector system according to claim 6, wherein the first tab holds the end of the locking arm over the locking fin when the plunger is moved to the disengaged position.

8. The electrical connector system according to claim 1, wherein the plunger is configured to lift the locking arm over the locking fin when the plunger is moved to the disengaged position.

9. The electrical connector system according to claim 1, wherein the locking arm defines an aperture in which the locking fin is received when the plunger is moved to the engaged position.

10. The electrical connector system according to claim 1, wherein the plunger and the second connector body are formed of a polymeric material, wherein the electrical connector system further comprises a metallic clip disposed within the second connector body, and wherein the spring is disposed between the plunger and the metallic clip.

11. The electrical connector system according to claim 1, wherein the spring is compressed when the plunger is moved from the engaged position to the disengaged position.

12. The electrical connector system according to claim 1, wherein the spring is relaxed when the plunger is moved to the engaged position.

13. The electrical connector system according to claim 1, wherein a portion of the plunger blocks upward movement of the locking arm when the plunger is moved to engaged position, thereby providing connector position assurance.

14. A method of connecting an electrical connector system which includes:

a first connector body defining a locking fin, a second connector body configured to receive the first connector body, a flexible locking arm defined by the second connector body configured to releasably engage the locking fin, a plunger slidably attached to the second connector body and moveable from an engaged position in which the plunger holds the locking arm in engagement with the locking fin to a disengaged position in which the plunger disengages the locking arm from the locking fin, and a spring disposed between the plunger and the second connector body and configured to urge the plunger into the engaged position, comprising;

engaging the second connector body with the first connector body;

moving the plunger from the engaged position to the disengaged position via contact between a push surface on a flexible arm of the plunger and a forward end of the first connector body as the first connector body is engaged with the second connector body;

compressing the spring as the plunger moves from the engaged position to the disengaged position;

moving the flexible locking arm to a released position to pass by the locking fin as the plunger moves from the engaged position to the disengaged position;

bending the flexible arm such that the push surface no longer contacts the forward end of the first connector body as the plunger reaches the disengaged position;

moving the plunger from the disengaged position to the engaged position as the spring decompresses because the push surface is no longer in contact with the forward end of the first connector body; and lowering the locking arm over the locking fin such that the locking fin is received within an aperture within the locking arm as the plunger moves back to the engaged position, thereby securing the first connector body to the second connector body.

15. The method according to claim 14, further comprising blocking upward movement of the locking arm by positioning a portion of the plunger over the locking arm when the plunger is moved to engaged position, thereby providing connector position assurance.

16. The method according to claim 14, wherein the spring is compressed as the plunger is moved from the engaged position.

17. The method according to claim 14, wherein the spring is relaxed when the plunger is moved to the engaged position.

18. A method of disconnecting an electrical connector system which includes:

a first connector body defining a locking fin, a second connector body configured to receive the first connector body, a flexible locking arm defined by the second connector body configured to releasably engage the locking fin, a plunger slidably attached to the second connector body and moveable from an engaged position in which the plunger holds the locking arm in engagement with the locking fin to a disengaged position in which the plunger disengages the locking arm from the locking fin, and a spring disposed between the plunger and the second connector body and configured to urge the plunger into the engaged position, comprising;

moving the plunger from the engaged position to the disengaged position;

moving the flexible locking arm to a released position to pass by the locking fin as the plunger moves from the engaged position to the disengaged position;

compressing the spring as the plunger moves from the engaged position to the disengaged position;

withdrawing the first connector body from the second connector body; and moving the plunger from the disengaged position to the engaged position as the spring decompresses, thereby separating the first connector body from the second connector body via contact between a push surface on a flexible arm of the plunger and a forward end of the first connector body.

19. The method according to claim 18, wherein the spring is compressed as the plunger is moved from the engaged position.

20. The method according to claim 18, wherein the spring is relaxed when the plunger is moved to the engaged position.

* * * * *